W. E. TULLAR.
CONTROLLING MEANS FOR MOTOR DRIVEN VEHICLES.
APPLICATION FILED JUNE 5, 1914.

1,212,286.

Patented Jan. 16, 1917.
4 SHEETS—SHEET 2.

Witnesses:

Inventor:
William E. Tullar ary to provide means to permit the
UNITED STATES PATENT OFFICE.

WILLIAM E. TULLAR, OF CHICAGO, ILLINOIS.

CONTROLLING MEANS FOR MOTOR-DRIVEN VEHICLES.

1,212,286.      Specification of Letters Patent.      Patented Jan. 16, 1917.

Original application filed March 6, 1912, Serial No. 681,917. Divided and this application filed June 5, 1914.
Serial No. 843,122.

*To all whom it may concern:*

Be it known that I, WILLIAM E. TULLAR, a citizen of the United States, residing at Chicago, in the county of Cook and State of Illinois, have invented certain new and useful Improvements in Controlling Means for Motor-Driven Vehicles, of which the following is a specification.

My invention which is fully described and illustrated in my pending application Serial No. 681,917, (Patent No. 1,128,079, granted on February 9, 1915,) of which the present application is a division relates in general to clutch shifting mechanisms and more particularly to devices for this purpose commonly used on automobiles and other motor-driven vehicles where it is desirable to provide means for shifting from one set of transmission gearing to another while the parts are rotating at high velocity.

I am aware that various forms of clutch shifting mechanisms have been constructed and employed prior to my invention but these have been merely of either the friction or positive engagement type. Where the former type has been used it has been found that where the power is continually transmitted through the friction devices that wear of the parts has been so rapid that the efficiency of power transmissions so constructed has been short-lived resulting in the continued slipping and consequent loss of power. Where positive engagement has been used to convey the power from the driving to the driven shaft utmost care has been necessitated in the shifting from one set of transmission gearing to another to prevent stripping the gears, it having been found necessparts, where such devices are used to come nearly or quite to rest before a new set may be thrown in.

An additional disadvantage of the clutch shifting mechanisms at present in use resides in the complicated system of levers and connections incidental to their use, which usually comprise an actuating lever positioned at the side of the driver's seat, so as to prevent entrance to the front of the car on that side.

I aim to produce a device that will permit changing from one set of transmission gearing to another regardless of the speed of the moving parts without danger to the said parts thereby enabling the machine to be operated by drivers comparatively inexperienced in the use of a car and comparatively unfamiliar with the use of machinery.

A further aim of my invention is to provide a clutch shifting mechanism which may be actuated by means of a pedal and a lever attached to the steering gear, obviating thereby the necessity of obstructing either entrance to the front of the car as has been necessary with the devices heretofore in use.

Further purposes and advantages of my invention will be apparent as it is better understood from the following description, which taken in connection with the accompanying drawings discloses one preferred embodiment thereof.

On the drawings.

On the drawings like characters of references refer to similar parts throughout the various figures.

For the purpose of illustrating my invention I have provided the driving shaft 11 designed to deliver the power from the engine to which it is connected to the plurality of gears 12, 13 and 14 of varying diameter which are designed to impart various speeds to the driven shaft as they are individually brought into operative relation therewith, as will be shown hereafter. The driven shaft 15 for the purposes of illustrating my invention is shown as being formed of material substantially square in cross section having the corners rounded off to provide no sharp edges, although it will be obvious that the shaft may be of any desired form with slight modification of the various parts to accommodate them to the desired form of shaft.

At predetermined positions upon the shaft 15 I have fitted the collars 16, said collars being adapted to rotate with the shaft and having an outer cylindrical bearing surface. These are preferably located directly beneath the gears mounted upon the driving shaft 11 and have loosely mounted thereon the rotatable members 17 which I have shown as turning freely upon the bearing rings 18 and 19 and the balls 20 interposed between the said rings and held in place by suitable retainers 21, although it will be obvious that the rotatable members 17 may turn directly upon the collars 16 or may be mounted thereupon in any suitable manner, it only being necessary for the purpose of the invention that they be free to turn independently of the shaft 15. These members are provided with collars 22 upon which are keyed gears 23 by means of the keys 24, the diameter of the gears being of suitable dimension to cause the gears each to mesh with a predetermined gear 12, 13 or 14 upon the driving shaft, the gears 23 being continually in mesh with the said gears. Each of the rotatable members 17 has attached to the collar 22 and formed integral therewith the disk 25 terminating at its periphery in the outwardly extending rim 26 which has fastened thereto the inwardly extending ring 27, which for the purpose of my invention is shown as connected thereto by means of a threaded engagement as at 28, it being manifest, however, that any desired fastening means may be employed.

To reverse the movement of the driven shaft I have provided upon the driving shaft the gear 29 adapted to operate by means of an idler (not shown), the rotatable member 30 which is mounted upon the collar 31 upon the driven shaft 15, provided with the gear 32 coöperating with the said idler, the rotatable member 30 being identical in construction and method of mounting with the members 17.

Figure 2:
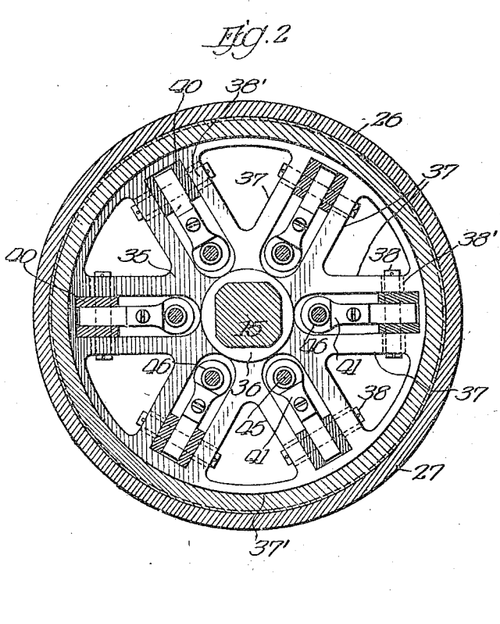
Fig. 2 is a sectional view of the transmission clutch taken along the line 2—2 of Fig. 1 showing means of connecting the friction ring to the spider.
Figure 3:
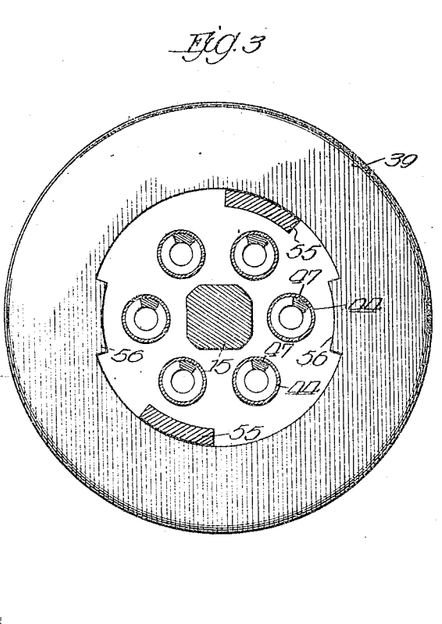
Fig. 3 is a sectional view along the line 3—3 of Fig. 1.
Figure 4:
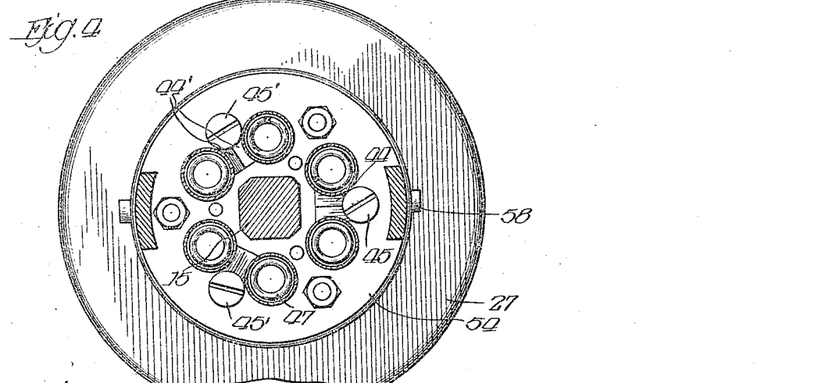
Fig. 4 is a sectional view along the line 4—4 of Fig. 1.

To compel the driven shaft 15 to rotate with a desired rotatable member I have provided the two sets of clutches 33 and 34, the former in number equal to the number of gears upon the driving shaft 11 and the latter in number equal to one-half the number of rotatable members. Each of the clutches 33 is adapted to engage frictionally with a rotatable member 17 and to this end is located between the disk 25 and the ring 27. This clutch is constructed of the spider 35 which consists in the preferred form of my invention herein described of the hub 36 fixed upon the shaft 15. The hub 36 has, extending outwardly therefrom, the spokes 37; arranged in pairs, the members of each pair being parallel and of sufficient distance apart to permit the insertion therebetween of certain members as will be hereinafter disclosed. To the outer extremities of the spokes is affixed the rim 37' formed preferably integral therewith, the diameter of the outer periphery of the rim 37' permitting it to rotate freely within a portion of the ring 27 in engagement with the rim 26 of the rotatable member 17. The spokes of each pair are provided with bearing blocks 38' carrying a pin 38 which is positioned perpendicular to a radius taken intermediate of the said spokes and forms the pivot pin for the friction dogs as will be later described. A ring 39 of outer circumference equal substantially to the circumference of the spider 35 is provided with the ears 40 arranged in pairs in spaced relation as is shown in cross section in Fig. 2, each pair of said ears being adapted to be snugly fitted within and between each pair of spokes 37 of the spider. The said ears are also provided with elongated apertures adapted to receive the pins 38. The outer surface of the ring 39 is milled to form a bearing surface adapted to frictionally engage, when the ring is moved outwardly away from the spider 35, with the inner surface of the inwardly extending ring 27.

To move any desired frictional clutch into contact with a rotatable member to lock the latter to the shaft 15 I have pivoted upon each pin 38 a friction dog 41, each provided with a shoulder 43 normally in contact with the inner face of the ring 33. These dogs are actuated by movement of the clutch 34 and to this end two sets of telescopic housings 44 are provided upon each of the clutches 34, one set on either side, each set comprising a number of housings equal to the numbers of dogs upon each frictional clutch, the said housings fitting within apertures provided in the clutches 34. These housings have each an ear 44' adapted to rest against the face of a clutch 34 the said ears being secured to the face of the clutch by means of the screws 45'. The end of each housing 45 is shaped to enter a suitable aperture in the free end of the dog, which for the purpose of my invention I have shown as being journaled in the circular aperture 46, having the opposite edges cut away to permit rotation of the dog along the pins 38. The opposite end of each housing is fastened securely within the clutch 34 and within each housing is mounted the expansion spring 47 extending the length of the housing. To effect more ready operation of the dogs 41 by movement of the clutch 34 I have provided a circular channel 48 adjacent the end of each housing adapted to receive the end of a plate 49 which is secured to each dog as at 50.

The clutch 34 for convenience in casting is shown as built up of two members 51 and 52, although it obviously may be, if desired, made in one piece, and is provided with the centrally arranged circumferential channel 53 about which is loosely mounted the ring 54 adapted to be rotated readily with respect to the said clutch 34. The clutches 34 are each provided with oppositely disposed lugs 55 adapted to enter within the inwardly extending ring 27 on the rotatable member 17. To engage these lugs and to thus bring the rotatable member into positive coöperation with the clutch 34, the ring 27 is provided with a plurality of outwardly extending lugs 56.

Figure 1:
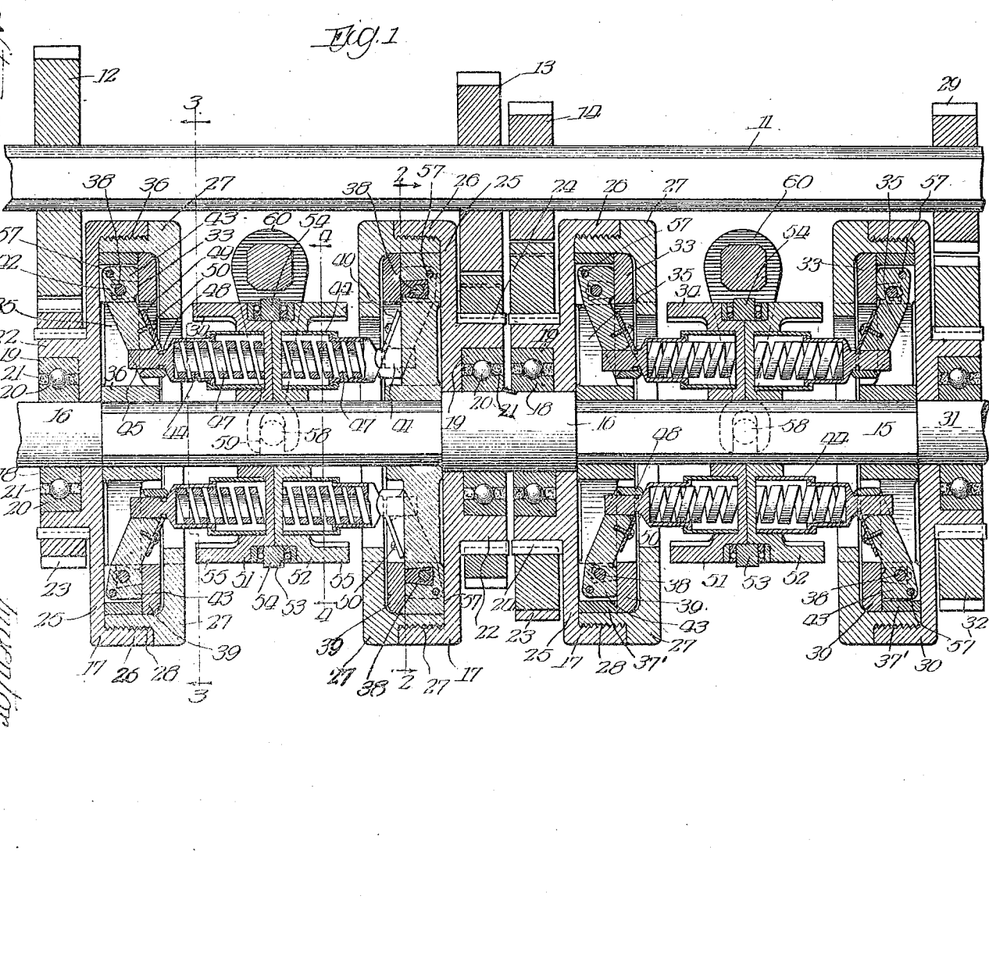
Figure 1 is a side elevation of a clutch shifting mechanism made in pursuance of my invention shown in cross section.

It is thus readily seen that each of the gears upon the driving shaft 11 is always in mesh with the gear upon its corresponding rotatable member, all of said rotatable members rotating continuously as the driving shaft rotates and in speeds varying in accordance with the ratio of the number of teeth upon the gear on the driving shaft to the teeth upon the gear keyed to the rotatable member. These members when the clutches are in inoperative position as shown in Fig. 1 turn freely upon the collars 16, permitting the shaft 15 to remain stationary. When it is desired to connect the driven shaft 15 to the driving shaft 11 by a particular set of transmission gearing, one of the clutches 34 is shifted to the right or left toward the desired set of transmission gearing. As a clutch 34 starts to move toward a rotatable member the expansion springs 47 will be compressed, forcing the dogs to rotate about the pivots 38, the shoulders 43 of the dogs moving the ring 39 upon the frictional clutch 33 into engagement with the ring 27 on the rotatable member in which the said clutch is located. As the clutch 34 is moved farther toward the desired rotatable member the lugs 55 will enter within the ring 27 and effect a positive engagement with the lugs 56 on the said ring. The rotatable members 17 are arranged in pairs having the sides upon which the rings 27 are disposed adjacent each other so that the single clutch 34 may coöperate with either of a pair of rotatable members and the clutch mounted within each member of said pair.

When it is desired to disconnect the shafts 11 and 15 it is only necessary to move the clutch 34 once more to its normal position, thereby withdrawing the lugs 55 from the lugs 56 and drawing the shoulder of the dogs 41 away from the ring 33. To compel the ring 33 to break its frictional engagement with the ring 27 I have provided the pin 57 inserted within properly positioned apertures in the ears 40 and the dog 41, the hole within the ears being slightly larger than the circumference of the pin to permit free operation of the dog and the establishment of frictional relation between the ring 33 and the ring 27.

To impart the desired movement to the clutches 34 I have provided upon each ring 54 a pair of studs 58, projecting a sufficient length on opposite sides of the clutches 54 to be embraced by the slot 59 at the ends of the bifurcated rocking member 60, which in turn is movable around the short pivot shaft 61. To an end of each of the pivot shafts 61 is attached at its center a vertical lever 62. To each end of each lever 62 is pivotally secured a link 63 bent in suitable shape to permit the ends 64 of the links to fall in substantially the same horizontal plane, and to terminate in substantial alinement when the clutches are in inoperative position. It is thus seen that in order to operate a clutch as hereinbefore described it is only necessary to impart a longitudinal movement to its corresponding link. To accomplish this and to permit a set of transmission gearing to be readily selected and securely fastened in operative position I have provided the controlling mechanism as is immediately hereinafter described.

Figures 5, 6, 7, 8:
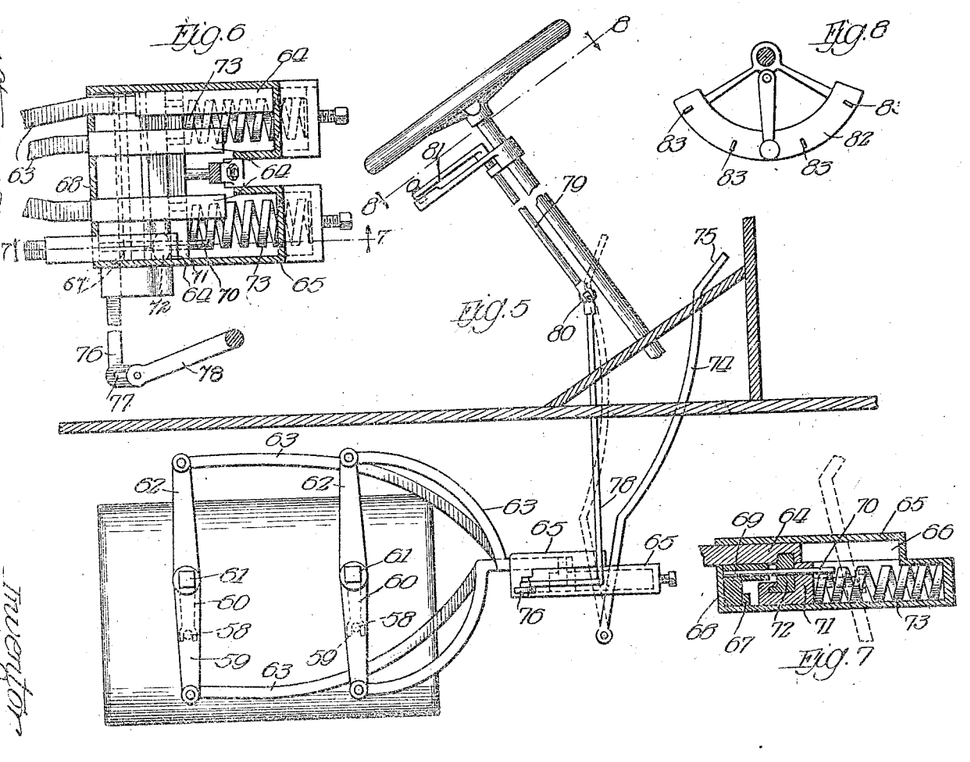
Fig. 5 is a side elevation of the mechanism operating the various clutches shown in Fig. 1.
Fig. 6 is an enlarged plan view with a portion of the housing cut away, of a portion of the operating mechanism shown in Fig. 5.
Fig. 7 is a sectional view along the line 7—7 of Fig. 6.
Fig. 8 is a sectional view along the line 8—8 of Fig. 5.

Within a housing 65 I have provided a chamber 66 within which the ends of the links are free to move. On the bottom of said housing and adjacent its rear is positioned the transverse upwardly extending rib 67. Between this rib and a rear wall 68 of the housing adapted to be moved transversely of the housing is the member 69 within which is fastened the pin 70 extending outwardly within housing as is shown in Fig. 7. Between the rib 67 and the front of the housing is disposed a track 71 extending throughout the width of the housing and adapted to be moved longitudinally thereof. The track 71, having a purpose which will be hereinafter described, is provided beneath the end of each link with an aperture adapted to receive the free end of the pin 70. Moving within the track 71 is the locking member 72 through which the pin 70 is disposed, the member 72 being free to move longitudinally of the pin as the track is moved longitudinally of the housing. The free ends of the links are each provided with a slot adapted to receive an upwardly projecting portion of the locking member 72, all of said slots being in alinement when the clutches 34 are all in inoperative position.

The track 71 is normally retained by means of the expansion springs 73 behind the said alined slots so that when all the clutches are in inoperative position the locking member 72 must rest between the ends of the links behind the said slots. To move the track longitudinally of the housing I have provided the lever 74 which is shown as terminating in a pedal 75, although any convenient means of operating the said lever may be resorted to. To move the member 69 transversely of the housing I have provided the member with an arm 76, having at its ends the slot 77 within which is pivotally mounted the end of a bent lever 78 and the lever 79 connected by the universal joint 80. Connected to the end of the lever 79 is the operating handle 81 which I have shown as positioned beneath and mounted upon the steering gear of the automobile, although it may be otherwise positioned if desired. The operating handle 81 is movable over an indicating segment 82 which is provided with slots 83, indicating a proper position of the handle 81 to bring a desired set of transmission gearing into coöperative relation and providing means for locking the handle in the said position. When it is desired to move any clutch into operative engagement with a rotatable member the pedal 75 must first be pressed forwardly from the position shown in dotted lines on Fig. 5 to that shown in full lines. This movement of the pedal carries the track 71 toward the front of the housing, compressing the springs 73, withdrawing the pin 70 from an aperture in the said track and alining the locking member 72 with the slots in the ends 64 of the links. Retaining the pedal in this position the handle 81 may be unlocked and moved to the desired position 83 upon the quadrant 82, thereby moving the sliding member 69 and the locking member 72 transversely of the housing into position beneath a desired link so that the locking member is engaged in the slot of the link when upon releasing the foot pedal 75 the pin 70 enters its proper aperture upon movement of the track 71 rearwardly of the housing, the locking member 72 carrying the link beneath the end of which it is positioned rearwardly with it as is shown in Fig. 6, the spring 73 serving to move the end of the link 64 and to cause the pin to retain the locking member 72 with a slot in the desired link. The link 64, when moved rearwardly rotates the lever 62 to which it is affixed and its rocking member 61 thereby moving the desired clutch 34 and producing as has been hereinbefore described first frictional engagement between the clutch 33 and its rotatable member, and subsequently positive engagement between the said member and the clutch 34.

Figure 9:
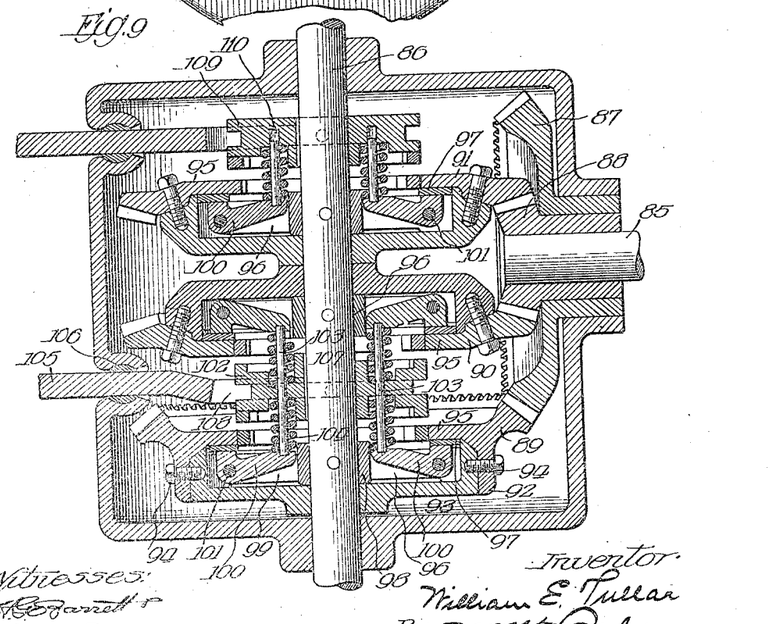
Fig. 9 is a sectional view showing a modification of the device disclosed in Fig. 1.

In Fig. 9 a modification of my clutch shifting mechanism is disclosed. In this form the driving shaft 85 is shown as perpendicular to the driven shaft 86 and has mounted upon it the two beveled gears 87 and 88, although it will be obvious that where a greater number of speeds is desired additional beveled gears may be supplied. In the form I have shown in Fig. 9 two speeds forward and one reversed are disclosed. The beveled gears 87 and 88 are secured upon the shaft 85 in any suitable manner. Upon the shaft 86 adapted to turn freely thereon are the beveled gears 89, 90 and 91. In the preferred embodiment of my invention these gears are shown as constituting the outer rim 92 which is fastened upon the loosely mounted rotatable member 93 by means of the screws 94, although it will be obvious that it may be made integral therewith. The gears 89, 90 and 91 are each provided with the inwardly extending internal ring 95, embracing between it and the rotatable member proper the frictional clutch 96 which is provided with a ring 97 adapted to bear against the inner face of the inwardly disposed ring 95 of the rotatable member. The ring 97 is connected to a hub 98 upon the shaft 86 by means of the spokes 99. To move the ring 97 into contact with the ring 95 a plurality of dogs 100 are pivotally mounted by means of the pins 101. Between the rotatable members 93 bearing the gears 89 and 90 is mounted a positively actuating clutch 102. This clutch is provided with a plurality of apertures extending therethrough in number equal to the number of dogs upon a single frictional clutch. Through each aperture is positioned a pin or rod 103, each of said pins having an end in contact with a dog upon each of the said rotatable members. This contact I have shown as preferably established by forming the rod 103 of proper length and inserting the ends of the rod within a receiving socket at the free ends of the said dogs. Between the said free ends of the dogs and the clutch 102 are positioned a plurality of expansion springs 104 coiled about the said pins having one end bearing against the end of the dog and the other end against the clutch, preferably within a recess provided for the purpose. The rotatable members and the clutch 34 are provided with the lugs as hereinbefore described in connection with the form of the invention shown in Fig. 1, and the operation of the frictional and positively actuating clutch is analogous with the devices described in connection therewith, the movement of the clutch, however, being accomplished by means of the lever 105, which is pivotally mounted in the housing as at 106, the said lever terminating in a yoke having a member disposed upon each side of the said clutch, the ends of the said yoke being provided with lugs 107 projecting inwardly into the annular slot 108 upon the clutch 102. When the lever 105 is rotated about the bearing 106 in either direction it will be seen that the clutch 102 is moved toward a rotatable member producing first a frictional engagement by the action of the spring upon the dogs 100 and later a positive engagement between the lugs on the clutch 102 and the lugs upon the ring 95. This lever 105 may be actuated by providing at the point about which it rotates the pivot shaft 61 and attaching thereto the operating device hereinbefore disclosed, and shown on Figs. 5, 6, 7 and 8 of the drawings.

To cause the shaft 86 to revolve in direction opposite that adapted to be actuated by means of the rotatable members 89 and 90, the rotatable member 91 is provided adapted to be rotated in the opposite direction to the members 89 and 90 by positioning it upon the opposite side of one of the beveled gears. This member is of construction identical with that of 89 or 90 and is also provided with the dogs 100, the frictional clutch 96 whose form has been hereinbefore described and a positively actuating clutch 109 of construction similar to the positively actuating clutch 102 hereinbefore described with this exception; the aperture to receive the rods 103 is not continued through the said clutch, the rods being of a length suitable to extend merely between the aperture within the dogs and a similar aperture within the clutch as is shown at 110.

It will be manifest that where a clutch shifting mechanism made in pursuance of my invention is employed that the danger of stripping the gears usually attendant upon the clutch shifting mechanisms in use when the same are employed in connection with the changing from one set of transmission gearing to another while the parts are rotating at high velocity is obviated in that the parts are first brought into frictional engagement and the movement of inertia is overcome thereby, causing all parts to be moving in the desired speed before a positive engagement between the said parts is established. I have provided a device for this purpose which is simple in construction, efficient in operation and which has attendant upon it none of the disadvantages hereinbefore experienced in connection with devices of this kind at present in use.

While I deem my device particularly applicable to automobiles and other motor-driven vehicles, and have illustrated my shifting mechanism in connection with one form of transmission used in automobiles, it is obvious that it may be readily adapted to be used with other forms of transmission commonly used in automobiles and that the invention as a whole may be used in any and all connections whenever it is desired to throw in a set of transmission gearing or to change from one set to another while the gears are operating at high velocity.

It will be manifest, moreover, that various changes in the details of construction, the arrangement of the parts and the number of sets of transmission gearing to be employed may be resorted to, within the scope of the appended claims, without departing from the spirit or scope of my invention, or sacrificing any of its benefits, the forms herein disclosed being merely preferred embodiments thereof.

I claim:

1. In a device of the character described, the combination of a driving mechanism, a driven mechanism, a plurality of devices for transmitting power from the driving to the driven mechanism, and means actuating the said devices, said actuating means comprising a controlling member for each device adapted to move the said device to establish operative relationship between the said driving and driven mechanisms, an element adapted to engage with and actuate any desired controlling member, means adapted to move the said element to engage and disengage the said element with a desired member, and means for holding the said element in and out of engagement with the said member.

2. In a device of the character described, the combination of a driving mechanism, a driven mechanism, a plurality of devices for transmitting power from the driving to the driven mechanism, and means actuating the said devices, said actuating means comprising a controlling member for each device adapted to move the said device to establish operative relationship between the said driving and driven mechanisms, an element adapted to move the said device to establish operative relationship between the said driving and driven mechanisms, an element adapted to engage with and actuate any desired member, means adapted to move said element into and out of engagement with the desired member, and an expansion spring for holding said element in engaged and disengaged relation with the said member.

3. In a device of the character described, the combination of a driving mechanism, a driven mechanism, a plurality of devices for transmitting power from the driving to the driven mechanism and means actuating the said devices, said actuating means comprising a controlling member for each device adapted to move the said device to establish operative relationship between the said driving and driven mechanisms, an element adapted to engage with and actuate any desired controlling member, an expansion spring for holding said element in engaged and disengaged position, and means adapted to move said element against the force of the said spring and to engage and disengage the said element with the desired member.

4. In a device of the character described, the combination of a driving mechanism, a driven mechanism, a plurality of devices for transmitting power from the driving to the driven mechanism, and means actuating the said devices, said actuating means comprising a controlling member for each device adapted to move the said device to establish operative relationship between the said driving and driven mechanisms, an element adapted to engage with and actuate any desired controlling member, an expansion spring for holding said element in engaged and disengaged position, means adapted to move said element against the force of the said spring, and means adapted to engage and disengage the said element with the desired member.

5. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a link having one end attached to a rotatable member, an element adapted to engage with the other end of said link for actuating the said link and rotatable member, means for engaging and disengaging the said element with the end of said link, and means for holding the said element in engaged and disengaged position.

6. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a plurality of links, each of said links having an end attached to a rotatable member, an element adapted to engage with the other end of a desired link to actuate the said link and its rotatable member, means for engaging and disengaging the said element with the end of a desired link, and means for holding the said element in engaged and disengaged position.

7. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a plurality of links, each of said links having an end attached to a rotatable member, the free ends of said links being disposed substantially in alinement, an element adapted to engage with the free end of a desired link to actuate the said link and its rotatable member, means for engaging and disengaging the said element with the end of a desired link, and means for holding the said element in engaged and disengaged position.

8. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a plurality of links, each link being attached at one end to a rotatable member, and having provided adjacent the other end a slot disposed across the said link, the slots of the said links being normally disposed in alinement, an element provided with a projection adapted to engage with the slot of a desired link to actuate the said link and rotatable member, means engaging and disengaging the said element with a link, and means holding the said element in engaged and disengaged position.

9. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a plurality of links, each of said links being attached at one end to a rotatable member, and being provided with a slot disposed across the said link adjacent the other end, said slots being substantially in alinement when the links are in inoperative position, an element provided with a projection adapted to engage the slot in a desired link, means normally holding the said element out of alinement with the said slots, means alining the said element with the said slot, and means for engaging the said element with the slot of a desired member.

10. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a lever secured substantially at its center to each rotatable member, links secured by an end to each end of each lever, the other end of each link being provided with a slot disposed across the said link, said slots being disposed substantially in alinement, an element provided with a projection adapted to engage and move rearwardly a desired link, means for engaging and disengaging the said element with the desired link, and means for locking the said element in engaged and disengaged position.

11. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a lever secured substantially at its center to each rotatable member, links secured by one end to the ends of the levers, and provided at their other ends with a slot, a housing, the ends of said levers being disposed within the housing and having the slots falling in substantial alinement therein, an element provided with a projection adapted to engage a slot in a desired link, means moving the said element transversely of the housing to engage and disengage a desired link, and means moving the said element longitudinally of the housing to lock it in engaged and disengaged position.

12. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a housing, links secured by one end to the ends of the said levers, having their other ends disposed within the said housing and movable longitudinally thereof, a track movable longitudinally of the said housing, an element movable in the said track adapted to engage the end of a desired link, means moving the said track longitudinally of the said housing, and means moving the said element transversely of the said housing in the said track.

13. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a housing, links secured by one end to the ends of the said levers, having their other ends disposed within the said housing and movable longitudinally thereof, a transversely disposed track mounted within and movable longitudinally of the said housing, an expansion spring normally forcing the said track toward the rear of the said housing, an element movable transversely of the said housing in the said track, means adapted to move the said element transversely of the said housing to engage the end of a desired link, and means moving the said track against the force of the said spring, said means serving to lock the said element in and out of engagement with the end of a link.

14. In a device of the character described, the combination of a driving mechanism, a driven mechanism, a plurality of devices for transmitting power from the driving to the driven mechanism and means actuating the said devices, said actuating means comprising a rotatable member connected to each device adapted to move it into and out of operative relation between the said mechanisms, a housing, links secured by one end to the ends of the said levers, having their other ends disposed within the said housing and movable longitudinally thereof, a track movable longitudinally of the said housing, an element movable in the said track adapted to engage the end of a desired link, a member movable transversely of the said housing, a pin connecting the said member with the said element, said pin being secured to the said member and extending longitudinally of the housing and adapted to lock the said element to the said track when the said element is in a desired position, means moving the said track longitudinally of the housing to lock and unlock the said element and track, and means moving the said transversely movable member and the said element when the said element is in unlocked relation with the said track.

15. In a device of the character described, the combination of a driving mechanism, a driven mechanism, a plurality of devices for transmitting power from the driving to the driven mechanism, and means actuating the said devices, said actuating means comprising a rotatable member connected to each device adapted to move it into and out of operative relation between the said mechanisms, a housing, links secured by one end to the ends of the said housing and movable longitudinally thereof, a track movable longitudinally of the said housing, an element movable in the said track adapted to engage the end of a desired link, a member movable transversely of the said housing, a pin connecting the said member with the said element, said pin being secured to the said member and extending longitudinally of the housing and adapted to lock the said element to the said track when the said element is in a desired position, means moving the said track longitudinally of the housing to lock and unlock the said element and track, said means comprising an expansion spring normally moving the said track rearwardly of the housing, a lever connected to the said track adapted to move it against the force of the said spring, said lever terminating in a foot pedal, and means moving the said transversely movable member and the said element when the said element is in unlocked relation with the said track.

16. In a device of the character described, the combination of a plurality of means for operating a speed-changing mechanism, a selector element adapted to selectively engage and actuate one of said means, means for engaging and locking said selector element in operative position, and means disposed upon the steering column of a motor-driven vehicle for moving said selector element to the desired selecting position when released from said locking means.

17. In a device of the character described, the combination of a plurality of means for operating a speed-changing mechanism, a movable selector element adapted to selectively engage and actuate one of said means, means for engaging and locking said selector element in operative position, and means for moving said selector element to the desired selecting position when released from said locking means.

18. In a device of the character described, the combination of a plurality of means for operating a speed-changing mechanism, a slidably mounted selector element adapted to selectively engage and actuate one of said means, means for locking said element, means for unlocking said element, and means for moving said element to the desired selecting position.

19. In a device of the character described, the combination of a plurality of means for operating a speed-changing mechanism, a slidably mounted selector element adapted to selectively engage and actuate one of said means, means for locking said element, a lever for unlocking said element, and means for moving said element to the desired selecting position.

20. In a device of the character described, the combination of a plurality of means for operating a speed-changing mechanism, a movable selector element for selectively engaging and actuating one of said means, means for engaging and locking said selector element in operative position, a lever adapted to be mounted upon the steering column of a motor-driven vehicle, and means for connecting said lever with said selector element.

21. In a device of the character described, the combination of a plurality of means for operating a speed-changing mechanism, a movable selector element for selectively engaging and actuating one of said means, means for engaging and locking said selector element in operative position, a quadrant adapted to be mounted upon the steering column of a motor-driven vehicle, a lever pivoted thereto, and means for connecting said lever with said selector element.

WILLIAM E. TULLAR.

Witnesses:
WM. O. BELT,
M. A. KIDDIE.